(12) United States Patent
Acharya

(10) Patent No.: US 10,380,067 B2
(45) Date of Patent: Aug. 13, 2019

(54) INTELLIGENT ARCHIVING OR PURGING USING RELATIONSHIP QUOTIENT AND IMPORTANCE FACTOR BY AGGREGATION

(71) Applicant: International Business Machines Corporation, Armonk, NY (US)

(72) Inventor: Rashmi Acharya, Karnataka (IN)

(73) Assignee: International Business Machines Corporation, Armonk, NY (US)

(*) Notice: Subject to any disclaimer, the term of this patent is extended or adjusted under 35 U.S.C. 154(b) by 308 days.

(21) Appl. No.: 15/246,190

(22) Filed: Aug. 24, 2016

(65) Prior Publication Data

US 2018/0060335 A1    Mar. 1, 2018

(51) Int. Cl.
*G06F 17/30* (2006.01)
*G06F 16/11* (2019.01)
*G06F 16/16* (2019.01)

(52) U.S. Cl.
CPC .......... *G06F 16/113* (2019.01); *G06F 16/162* (2019.01)

(58) Field of Classification Search
CPC ............................................. G06F 17/30073
See application file for complete search history.

(56) References Cited

U.S. PATENT DOCUMENTS

| 9,317,417 B2* | 4/2016 | Lemus | G06F 17/30 |
| 2002/0010659 A1* | 1/2002 | Cruse | G06Q 10/087 705/28 |
| 2007/0100950 A1* | 5/2007 | Bornstein | G06Q 10/107 709/206 |
| 2009/0313346 A1* | 12/2009 | Sood | G06Q 10/10 709/207 |

\* cited by examiner

*Primary Examiner* — Syed H Hasan
(74) *Attorney, Agent, or Firm* — Patterson + Sheridan, LLP

(57) ABSTRACT

Techniques are disclosed for managing a large set of data items, such as electronic data interchange (EDI) transactions or e-mail messages. A data item in a data set is received. The data item is exchanged between a first entity and a second entity. A relationship measure is determined between the first entity and the second entity relative to hierarchical information between the first entity and the second entity. An importance measure of the data item is determined based on the relationship measure. The importance measure is assigned to the data item. Further, the data items may be aggregated using pattern matching techniques relative to the importance factor, the aggregation of which may be used for intelligent archiving or purging decisions.

20 Claims, 6 Drawing Sheets

INTELLIGENT ARCHIVING OR PURGING USING RELATIONSHIP QUOTIENT AND IMPORTANCE FACTOR BY AGGREGATION

BACKGROUND

Embodiments presented herein generally relate to data management, and more specifically, to identifying relationship and importance information for a given item in a data set.

Managing large amounts of data is a known issue in many organizations. For example, in a business-to-business (B2B) or a business-to-consumer (B2C) setting, organizations use an electronic data interchange (EDI) communications between two organizations can rise to large volumes of various transaction documents, such as purchases, payments, and invoices. In addition, a B2B entity may exchange numerous transactions of varied proportions with different B2B partners on a daily basis.

Generally, EDI transactions reside in a relational database or file system. Further, because an entity may generate numerous transactions on a regular basis, an organization may purge older transactions or maintain those transactions in an archive database, e.g., according to some retention policy. However, one concern regarding this approach is that many retention policies only make archival decisions based on date. Given that some past communications may be vital for an organization, using date as a single criterion may be ineffective. A user may manually flag a given transaction to prevent the transaction from being purged, however, doing so may be time-consuming and inconsistently applied.

SUMMARY

One embodiment presented herein discloses a method. The method generally includes receiving a first data item of a plurality of data items of a data set, wherein the first data item is exchanged between a first entity and a second entity. A relationship measure is determined between the first entity and the second entity relative to hierarchical information between the first entity and the second entity. An importance measure of the first data item is determined based on the relationship measure. The importance measure is assigned to the first data item. The importance measure is used for an archiving decision for the first data item.

Another embodiment presented herein discloses a computer program product. The computer program product includes a computer-readable storage medium storing instructions, which, when executed on a processor, performs an operation. The operation itself generally includes receiving a first data item of a plurality of data items of a data set, wherein the first data item is exchanged between a first entity and a second entity. A relationship measure is determined between the first entity and the second entity relative to hierarchical information between the first entity and the second entity. An importance measure of the first data item is determined based on the relationship measure. The importance measure is assigned to the first data item. The importance measure is used for an archiving decision for the first data item.

Yet another embodiment presented herein discloses a system. The system includes a processor and a memory. The memory stores program code having instructions, which, when executed on the processor, performs an operation. The operation itself generally includes receiving a first data item of a plurality of data items of a data set, wherein the first data item is exchanged between a first entity and a second entity. A relationship measure is determined between the first entity and the second entity relative to hierarchical information between the first entity and the second entity. An importance measure of the first data item is determined based on the relationship measure. The importance measure is assigned to the first data item. The importance measure is used for an archiving decision for the first data item.

BRIEF DESCRIPTION OF SEVERAL VIEWS OF THE DRAWINGS

So that the manner in which the above-recited features of the present disclosure can be understood in detail, a more particular description of the disclosure, briefly summarized above, may be had by reference to the embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Figure 1:
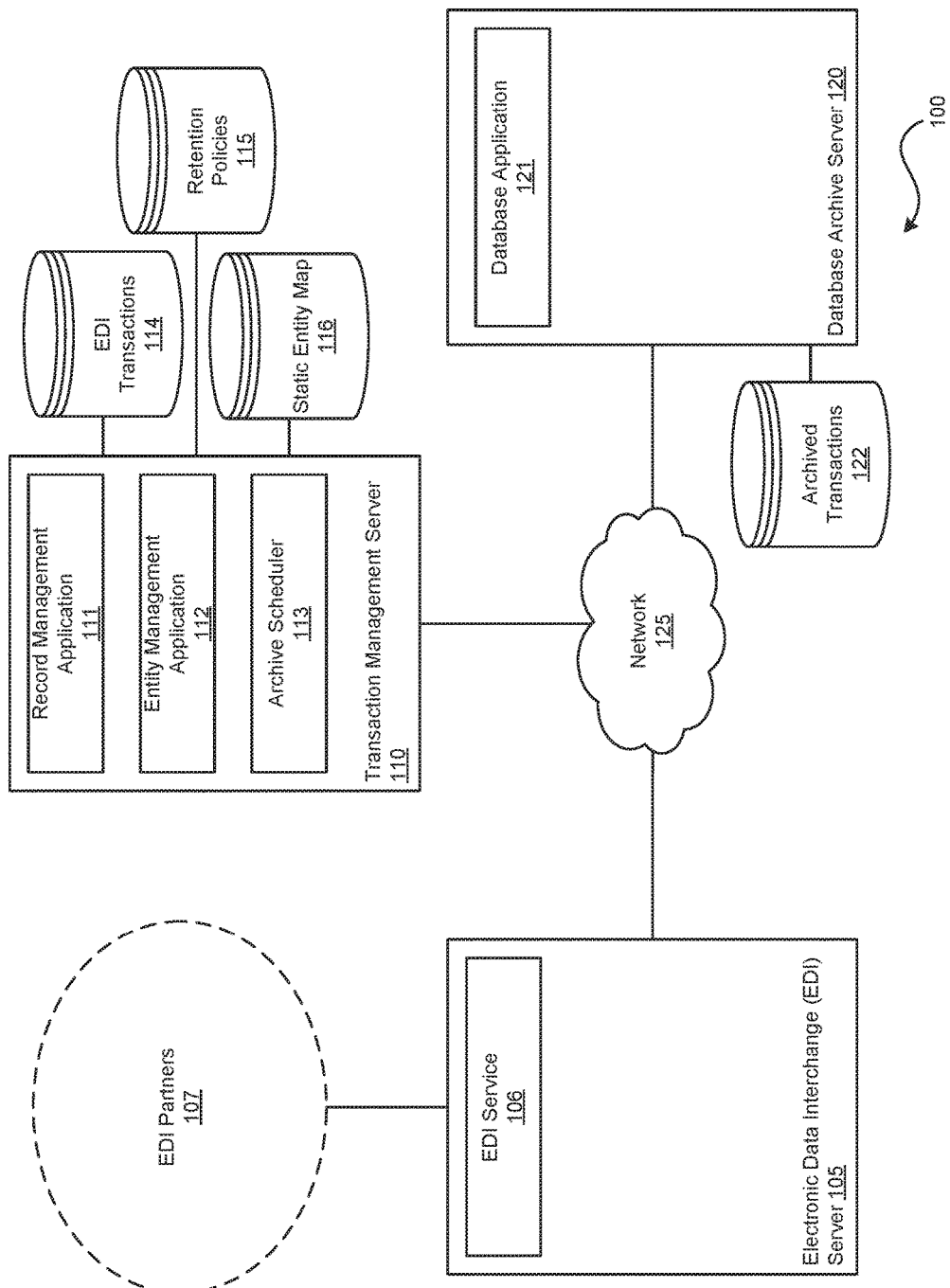
FIG. 1 illustrates an example computing environment, according to one embodiment.

Embodiments presented herein describe techniques for maintaining a large amount of data. In particular, techniques disclose determining relationship and importance information for items in a large data set. For example, embodiments may be adapted to an electronic data interchange (EDI) infrastructure. Generally, EDI allows an organization to electronically exchange documents (e.g., purchase orders, invoices, shipping notices, and the like) with other partner organizations, e.g., under a business-to-business (B2B) or business-to-client (B2C) arrangement. Records of each document may be stored as transactions in a relational database. A transaction can include information associated with a document such as information regarding the entities associated with the transaction, such as organization partners involved in the transaction, whether a sender of an underlying document is a manager or an employee, etc. Such a system may archive or purge a given transaction based on predefined retention policies.

In one embodiment, an entity management application executing in a system evaluates each transaction and assigns a relationship quotient between entities in the transaction. A relationship quotient indicates a measure of strength between two entities based on a volume of communication that the entities conduct with one another relative to a predefined hierarchy level associated with each entity. In particular, an entity at a given level is assigned a hierarchy quotient, e.g., where the higher the level, the higher the quotient. For example, an entry-level employee may have a lower hierarchical quotient than a district manager.

In one embodiment, the entity management application may use the identified relationship quotient assigned to each entity in a given transaction to determine and assign an importance factor to the transaction. The entity management application may then associate the transaction with a given bucket, organized based on importance factor. Thereafter, an archive scheduler executing on the system may evaluate the importance factor (as well as other criteria based on pre-defined retention policies) and determine whether to retain the transaction (e.g., in an archive database) or purge the transaction. For example, a given retention policy may indicate to the archive scheduler to purge all transaction older than a year and having an importance factor falling below a specified threshold. Further, the retention policy may indicate to the archive scheduler to archive transactions older than a year but having an importance factor exceeding that threshold.

As will be further described below, techniques provide an approach for archiving or purging data items, such as EDI transactions, based on relationship information associated with entities in each transaction. Advantageously, an importance factor associated with a transaction allows the computer system to determine, using at least in part the importance of a transaction, whether to archive or purge the transaction from a relational database. For instance, the importance factor may serve as additional criteria for archiving or purging decisions for EDI transactions. Further, because the entity management application dynamically assigns an importance factor to a given transaction, the system may more efficiently maintain EDI transactions, resulting in overall improved performance of the system.

Note, the following describes determining a measure of importance of an electronic data interchange (EDI) transaction based on relationship and hierarchy information associated with entities involved in the transaction. However, one of skill in the art will recognize that embodiments may be adapted to various computing environments that require regular maintenance of large amounts of data. For example, embodiments may be adapted to an e-mail system of an organization. That is, an entity management application, e.g., residing in an e-mail server, may determine and assign relationship quotients to individual e-mail messages based on hierarchy data determined relative to the sender and recipient exchanging the e-mail. The entity management application may then determine an importance factor for a transaction from the relationship quotient determined based at least in part on hierarchical data. This importance factor may then be used to make archiving or purging decisions, e.g., based on a retention policy that includes the importance factor.

FIG. 1 illustrates an example computing environment 100, according to one embodiment. As shown, computing environment 100 includes an electronic data interchange (EDI server) 105, one or more EDI partners 107, a transaction management server 110, and a database archive server 120, each interconnected via a network 125 (e.g., the Internet).

In one embodiment, the EDI server 105 is representative of a computer system handling EDI transactions for a given organization. The EDI server 105 may be a physical computing system or a virtual computing instance executing in the cloud. Illustratively, the EDI server 105 includes an EDI service 106. Generally, the EDI service 106 transfers structured communications between the EDI server 105 and the EDI partners 107 according to EDI standards agreed upon by the organization and EDI partners 107. For example, assume that the EDI server 105 is of an organization that routinely engages in transactions with the EDI partners 107. Structured communications include documents, e.g., purchase orders, acknowledgments, shipping notices, invoices, and the like that are sent between the EDI service 106 and a recipient EDI partner 107. Further, the EDI service 106 may persist the EDI communications in a database, such as that maintained by the transaction management server 110.

In one embodiment, the transaction management server 110 may be a physical computing system or a virtual computing instance executing in the cloud. As shown, the transaction management server 110 includes a record management application 111, an entity management application 112, an archive scheduler 113, one or more EDI transactions 114, one or more retention policies 115, and a static entity map 116. In one embodiment, the record management application 111 maintains a relational database storing the EDI transactions 114. The EDI transactions 114 themselves may include data and metadata describing an underlying EDI document, such as sender and recipient information, date and timestamp, document type, and other information. In one embodiment, the archive scheduler 113 periodically archives or purges the EDI transactions 114 from the relational database, e.g., according to the retention policies 115. The retention policies 115 generally provide rules and criteria for archiving or purging an EDI transaction 114.

For example, criteria may specify a date retention period indicating a length of time that a given EDI transaction 114 may be maintained in the relational database prior to being stored in the database archive server 120. The archiving scheduler 113 may then communicate with a database application 121 executing on the archiving scheduler 113. In turn, the database application 121 may persist the EDI transaction 114 in an archive data store (e.g., as one of archived transactions 122).

In one embodiment, the entity management application 112 evaluates information relating to each EDI transaction 114 to determine an importance factor for the transaction 114. Advantageously, the importance factor serves as a criterion for the retention policies 115 that allows the archive scheduler 113 to archive or purge a given transaction 114 by relative importance of the transaction 114 to predefined relationships between underlying sender and recipient entities. As will be further described below, the importance factor in a transaction 114 is a value derived from a predefined relationship quotient value between the entities and a total volume of EDI transactions between the entities.

Figure 2:
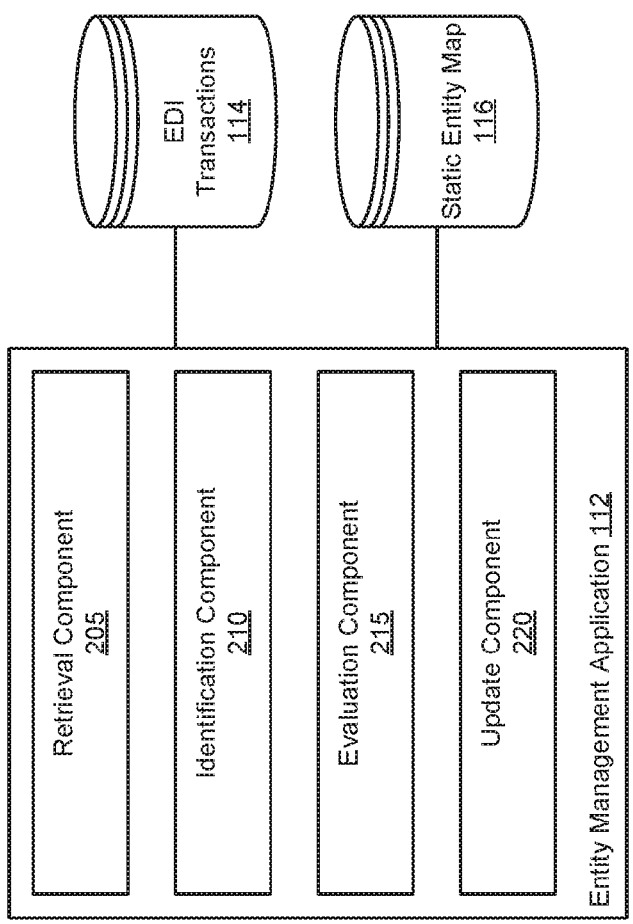
FIG. 2 further illustrates the entity management application described relative to FIG. 1, according to one embodiment.

FIG. 2 further illustrates the entity management application 112, according to one embodiment. As shown, the entity management application 112 includes a retrieval component 205, an identification component 210, an evaluation component 215, and an update component 220.

In one embodiment, the retrieval component 205 obtains EDI transactions 114 from a relational database in which the transactions are stored. To do so, the retrieval component 205 may communicate with the record management application 111 and request a given transaction 114. In turn, the record management application 111 may send the transaction 114 and any associated metadata with the transaction 114.

In one embodiment, the identification component 210 receives the transaction 114 from the retrieval component 205 and determines entity information associated with the EDI transaction 114. As stated, an entity may correspond to, e.g., a sender or a recipient of a particular EDI transaction 114. Further, the identification component 210 may evaluate a static entity map 116 to determine relationship information between the entities. In one embodiment, the static entity map 116 provides information regarding mappings between entities involved in EDI transactions. For example, the static entity map 116 may specify a total volume of communications exchanged between a given entity A and an entity B. In addition, the static entity map 116 may indicate hierarchical quotient values between the entities.

In one embodiment, a hierarchical quotient is a predefined value assigned to a relationship between an entity and another entity. The value of the hierarchical quotient may depend on a number of levels of hierarchy within an organization (or relative to a partner 107) between the two entities. Generally, the closer in level between the entities, the higher the hierarchical quotient. Below is a table providing an example distribution of hierarchical quotient values:

| Number of Levels | Quotient Value |
|---|---|
| 1 | 100 |
| 2 | 50 |
| 3 | 33 |
| 4 | 25 |
| 5 | 20 |
| 6 | 17 |
| 7 | 15 |
| 8 | 12 |
| 9 | 11 |
| 10 | 10 |

In this example, assume that employee A and employee B report to a manager C, where the employees A and B are three levels disconnected between manager C. In such a case, employees A and B are within the same level through the relation to C. Consequently, the hierarchical quotient value between employees A and B are higher (value of 100) than the hierarchical quotient value than between, e.g., employee A and manager C (value of 33). The hierarchical quotient values are predefined for entities within the organization as well as between entities of the partners 107.

In one embodiment, the evaluation component 215 derives a relationship quotient between the entities associated with a given EDI transaction 114. The relationship quotient indicates a correlation between a strength of a relationship between the entities relative to the total number of communications exchanged between the entities (as reflected by the record management application 111). For example, the relationship quotient may be expressed as:

Relationship Quotient=Hierarchical Quotient*Number of Previous EDI Transactions Exchanged/Total Volume of Overall EDI Transactions Once determined, the evaluation component 215 determines an importance factor measure to associate with the EDI transaction 114. The evaluation component 215 may determine the importance factor based on the relationship quotient. For instance, the importance factor is generally directly proportional to the relationship quotient. Further, the archive scheduler 113 may structure the importance factor in buckets labeled between 1 to 10, where an importance factor of 1 indicates a lower relationship quotient and an importance factor of 10 indicates a higher relationship quotient.

In one embodiment, the update component 220 may assign the determined importance factor to the EDI transaction 114. To do so, the update component 220 may generate metadata for the EDI transaction 114 and associate the metadata with the EDI transaction 114 in the relational database. Further, the update component 220 also provides the static entity map 116 with the most recent relationship quotient determination.

Figure 3:
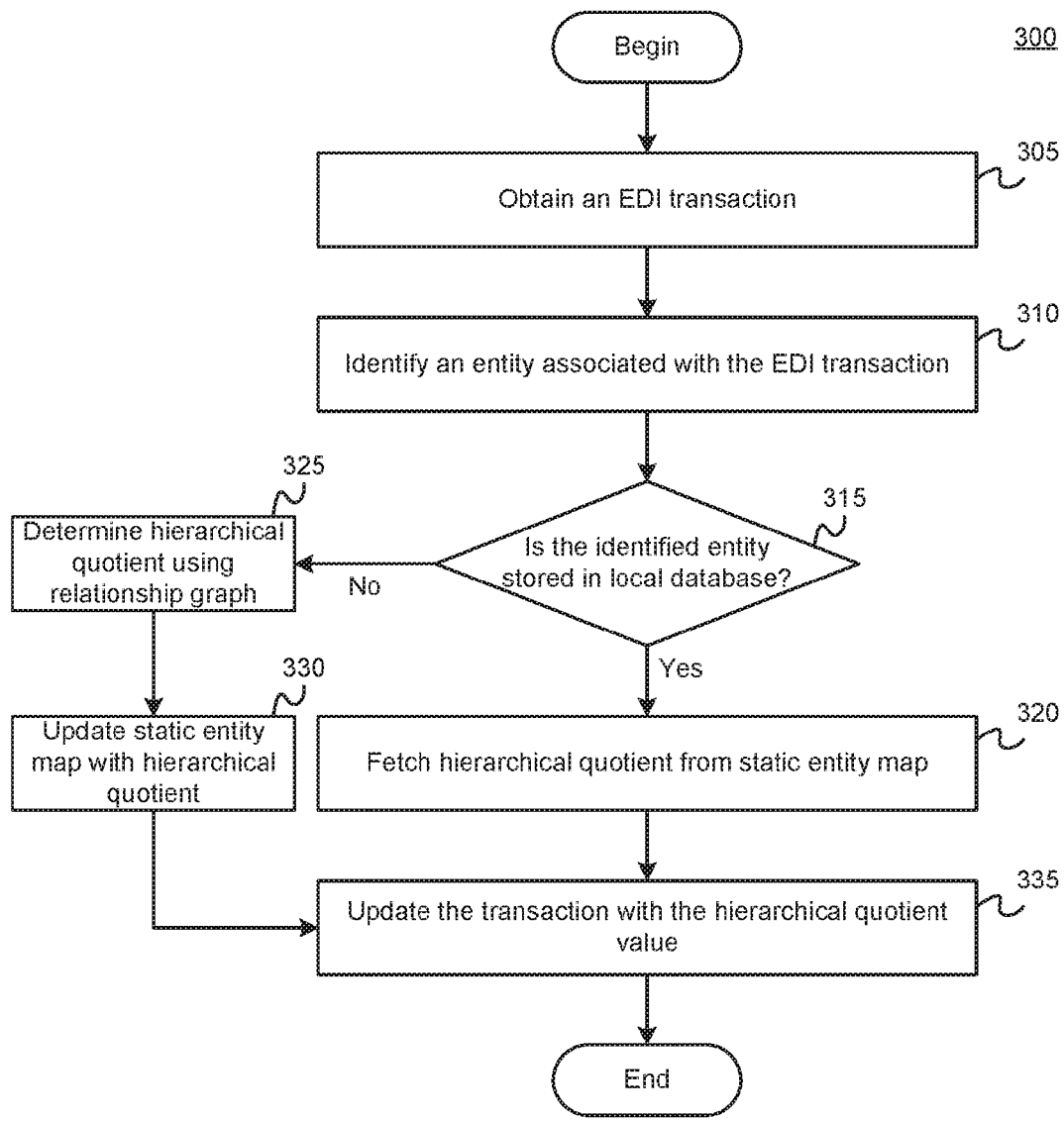
FIG. 3 illustrates a method for identifying a hierarchical quotient value for a given transaction, according to one embodiment.

FIG. 3 illustrates an example method 300 for identifying a hierarchical quotient value for a given electronic data interchange (EDI) transaction, according to one embodiment. As shown, method 300 begins at step 305, where the retrieval component 205 obtains an EDI transaction. As stated, the retrieval component 205 may request the record management application 111 to send any new EDI transactions 114 to the retrieval component 205. In turn, the record management application 111 sends a given EDI transaction 114 to the retrieval component 205.

At step 310, the identification component 210 determines one or more entities associated with the EDI transaction. To do so, the identification component 210 evaluates the EDI transaction 114 for, e.g., sender and recipient information specified in the EDI transaction 114. Each of the sender and the recipient corresponds to an entity. The static entity map 116 may provide additional information regarding the entities, such as hierarchical quotient data between the entities, if the entity is already maintained in the static entity map.

At step 315, the identification component 210 determines whether a given entity in the EDI transaction 114 is stored in the relational database, e.g., in a relationship graph stored in the database. For instance, in some cases, the entity might not have previously engaged in an EDI transaction 114 with the other entity. However, if the identified entity is stored in a database, then the method 300 proceeds to step 320, where the identification component 210 obtains the hierarchical quotient assigned to the entities from the static entity map 116.

Otherwise, at step 325, the identification component 210 determines a hierarchical quotient for the entity. To do so, the identification component 210 may determine a number of levels separating each of the entities. The identification component 210 may use the number of levels to determine a predefined hierarchical quotient corresponding to that number of levels. Once determined, at step 330, the update component 220 updates the static entity map with the hierarchical quotient for the entities. At step 335, the update component 220 generates metadata specifying the hierarchical quotient value. The update component 220 may then associate the hierarchical quotient value metadata with the transaction.

Figure 4:
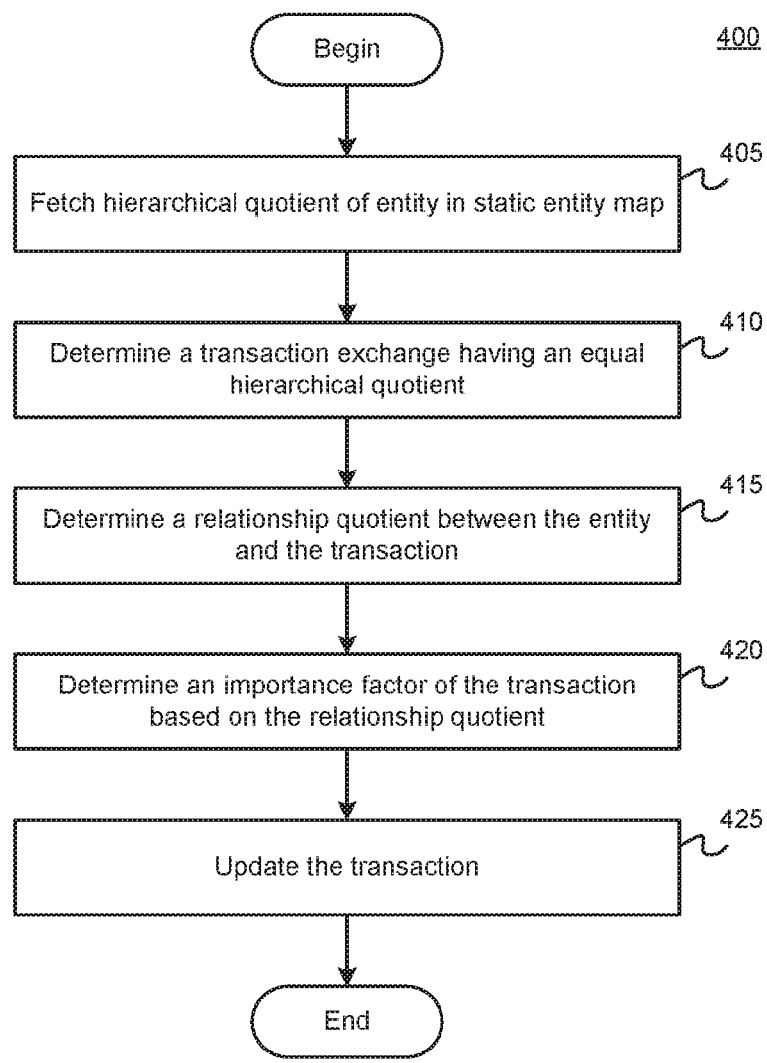
FIG. 4 illustrates a method for identifying an importance factor for a given transaction, according to one embodiment.

FIG. 4 illustrates an example method 400 for identifying an importance factor for a given EDI transaction, according to one embodiment. As stated, the importance factor may be used to determine whether to archive or purge a given transaction from the relational database, e.g., based on retention policies 115. At step 405, the evaluation component 215 fetches a hierarchical quotient of the entities associated with the EDI transaction 114 in the static entity map.

At step 410, the evaluation component 215 identifies a volume of EDI transactions 114 stored in the relational database having an equal hierarchical quotient value to the current transaction 114. At step 415, the evaluation component 215 determines a relationship quotient for the entities specified in the transaction 114 based on the hierarchical quotient value and the total volume of EDI transactions 114 stored in the relational database with the equal hierarchical quotient.

At step 420, the evaluation component 215 determines an importance factor for the transaction using the determined relationship quotient. In one embodiment, the importance factor is directly proportional to the relationship quotient. At step 425, the update component 220 associates the importance factor with the transaction. To do so, the update component 220 can generate metadata specifying a value representing the importance factor. The update component 220 may then associate the metadata with the transaction 114 in the relational database.

Figure 5:
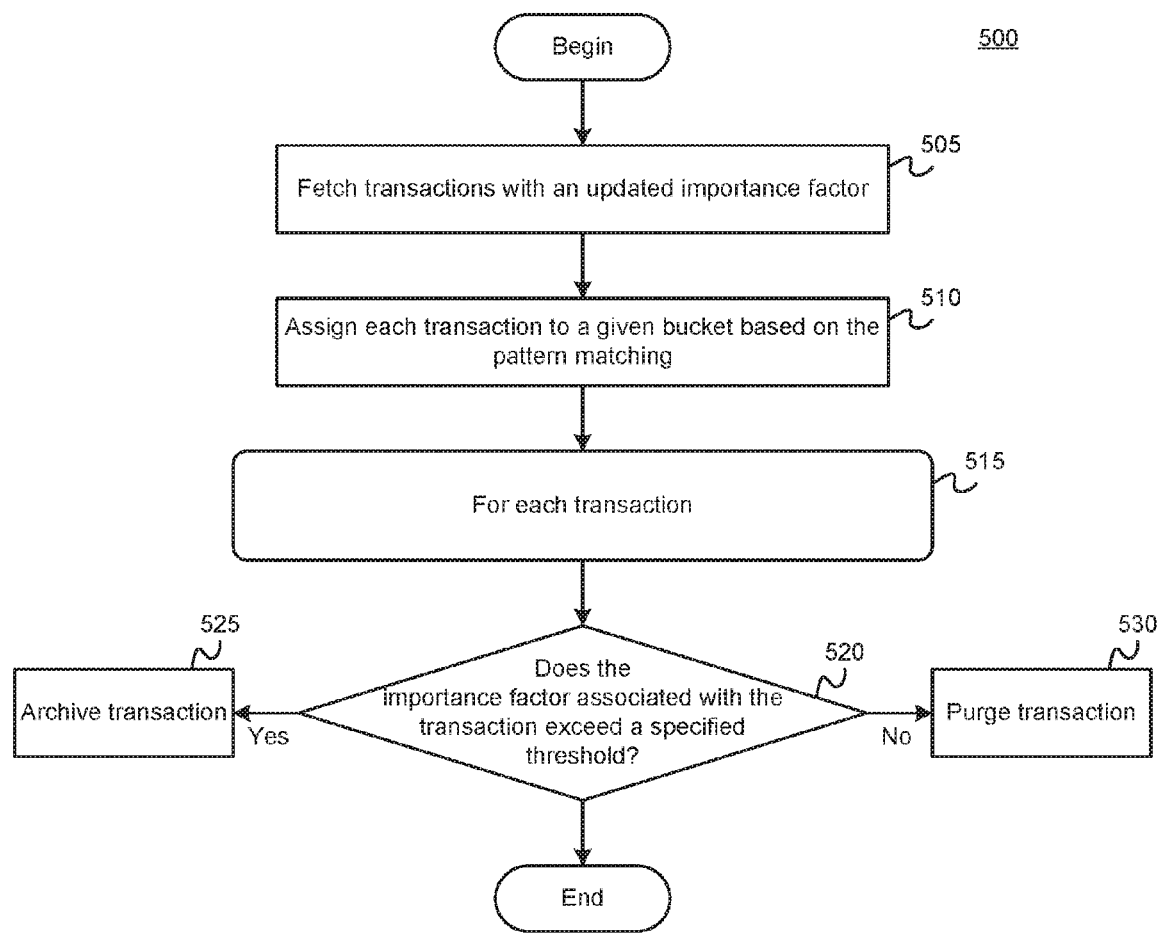
FIG. 5 illustrates a method for maintaining transactions based on relationship quotient and importance factor data, according to one embodiment.

FIG. 5 illustrates an example method 500 for maintaining EDI transactions based on relationship quotient and importance factor data, according to one embodiment. The archive scheduler 113 may make intelligent archival decisions based on the importance factor associated with each transaction maintained in the relational database. As shown, method 500 begins at step 505, where the archive scheduler 113 obtains transactions having an updated importance factor. For example, to do so, the archive scheduler 113 communicates with the record management application 111 for EDI transactions 114 that have an importance factor value updated within a specified period of time.

At step 510, the archive scheduler 113 assigns the transactions to a corresponding importance factor bucket. That is, the archive scheduler 113 may assign a given transaction 114 to a corresponding importance factor bucket. As stated, transactions may be bucketed based on the value of the importance factor relative to the buckets. For example, the buckets may be numbered between 1 to 10, where an importance factor corresponding to 10 represents a relatively high importance factor.

At step 520, the method 500 enters a loop for each of the EDI transactions 114. At step 525, the archive scheduler 113 determines whether the importance factor associated with the EDI transaction 114 exceeds a specified threshold. In addition, the archive scheduler 113 may evaluate whether the transaction 114 is assigned to a bucket corresponding to transactions 114 that do not exceed the threshold. If the importance factor exceeds the threshold, then at step 525, the archive scheduler 113 archives the EDI transaction 114. For instance, the archive scheduler 113 may transfer the EDI transaction 114 to a relational database for archived transactions 122, e.g., via the database application 121. Otherwise, if the importance factor does not exceed the threshold, then at step 530, the archive scheduler 113 purges the transaction from the relational database. In addition, the archive scheduler 113 may apply other criteria to the transactions, e.g., if specified in the retention policies 115.

Figure 6:
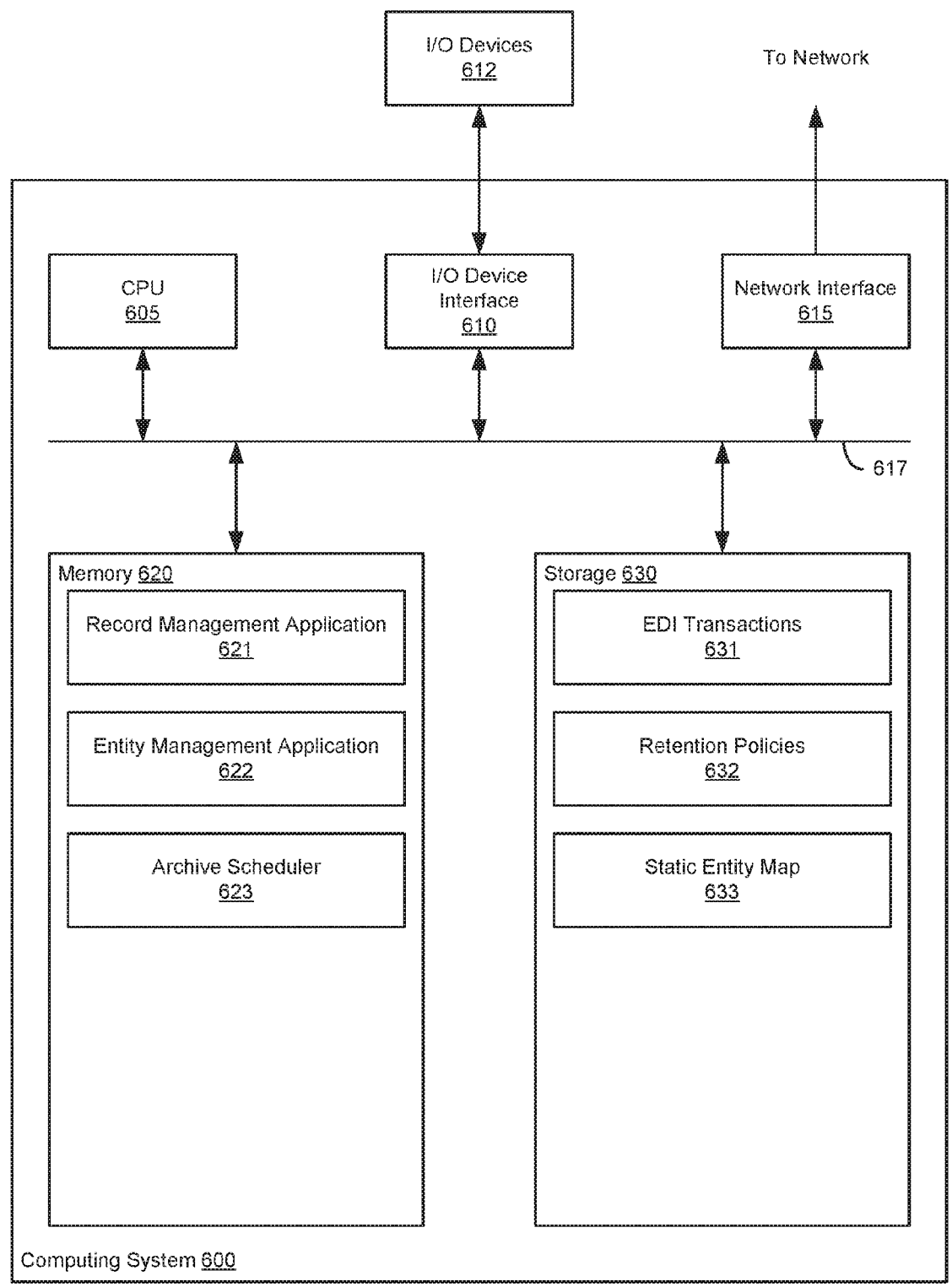
FIG. 6 illustrates an example computing system configured to maintain transactions based on relationship and importance measures associated with each transaction, according to one embodiment.

FIG. 6 illustrates an example computing system 600 configured to maintain EDI transactions based on relationship and importance measures associated with each transaction, according to one embodiment. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, display, mouse devices, etc.) to the computing system 600. Further, in context of the present disclosure, the computing elements shown in the computing system 600 may correspond to a physical computing system (e.g., a system in an enterprise network) or a virtual computing instance.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a record management application 621, an entity management application 622, and an archive scheduler 623. And storage 630 includes one or more EDI transactions 631, one or more retention policies 632, and a static entity map 633. In one embodiment, the record management application 621 maintains a relational database storing the EDI transactions 631. The entity management application 622 evaluates the EDI transactions 631 to determine an importance factor to associate with each transaction. As stated above, the importance factor may be based on hierarchical relationship data between two entities associated with the transaction. Further, the entity management application 622 also evaluates and stores data associated with the entities, e.g., hierarchical quotients, relationship quotients, and the like, to the static entity map 633. Further still, the archive scheduler 623 makes archiving or purging decisions based on the importance factor (as well as other criteria specified in the retention policies 632) associated with each transaction 631.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

In context of the present disclosure, a user may access applications (e.g., the entity management application) or related data available in the cloud. For example, the entity management application could execute on a computing system in the cloud and determine an importance factor for each EDI transaction maintained in a relational database of an organization. In such a case, the entity management application could determine an importance factor for a given EDI transaction and store static entity map data at a storage location in the cloud. Doing so allows a user to access this information from any computing system attached to a network connected to the cloud (e.g., the Internet).

While the foregoing is directed to embodiments of the present disclosure, other and further embodiments of the present disclosure may be devised without departing from the basic scope thereof, and the scope thereof is determined by the claims that follow.

What is claimed is:

1. A method, comprising:
   receiving a first data item of a plurality of data items of a data set, wherein the first data item was exchanged between a first entity and a second entity;
   determining a number of levels between the first entity and the second entity in a predefined hierarchy that includes the first and second entities;
   generating a first hierarchical quotient for a relationship between the first and second entities, based on the determined number of levels, wherein the determined number of levels is inversely related to the first hierarchical quotient;
   determining a total number of data items in the data set that were exchanged between the first and second entities;
   determining an overall number of data items in the data set that were exchanged between sets of entities having a hierarchical quotient matching the first hierarchical quotient;
   determining a relationship measure between the first entity and the second entity based on the first hierarchical quotient for the relationship between the first and second entities, the total number of data items, and the overall number of data items;
   determining an importance measure of the first data item based on the relationship measure;
   assigning the importance measure to the first data item, wherein the importance measure is used for an archiving decision for the first data item; and
   selectively archiving the first data item, based on the importance measure of the first data item.

2. The method of claim 1, wherein selectively archiving the first data item comprises:
   upon determining that the importance measure exceeds a specified threshold, archiving the first data item to a data store.

3. The method of claim 1, wherein selectively archiving the first data item comprises:
   upon determining that the importance measure does not exceed a specified threshold, deleting the first data item.

4. The method of claim 1, wherein the relationship measure is directly proportional to the first hierarchical quotient and the total number of data items, and is inversely proportional to the overall number of data items.

5. The method of claim 1, wherein the importance measure is directly proportional to the relationship measure.

6. The method of claim 1, wherein the plurality of data items each correspond to an electronic data interchange (EDI) transaction.

7. The method of claim 1, further comprising:
   assigning the first data item to a first bucket of a plurality of buckets based on the importance measure; and
   determining whether to archive or delete the first data item, based on the first bucket.

8. A computer program product, comprising:
   a computer-readable storage medium storing instructions, which, when executed on a processor, performs an operation, comprising:
   receiving a first data item of a plurality of data items of a data set, wherein the first data item was exchanged between a first entity and a second entity;
   determining a number of levels between the first entity and the second entity in a predefined hierarchy that includes the first and second entities;
   generating a first hierarchical quotient for a relationship between the first and second entities, based on the determined number of levels, wherein the determined number of levels is inversely related to the first hierarchical quotient;
   determining a total number of data items in the data set that were exchanged between the first and second entities;
   determining an overall number of data items in the data set that were exchanged between sets of entities having a hierarchical quotient matching the first hierarchical quotient;
   determining a relationship measure between the first entity and the second entity based on the first hierarchical quotient for the relationship between the first and second entities, the total number of data items, and the overall number of data items;
   determining an importance measure of the first data item based on the relationship measure;
   assigning the importance measure to the first data item, wherein the importance measure is used for an archiving decision for the first data item; and
   selectively archiving the first data item, based on the importance measure of the first data item.

9. The computer program product of claim 8, wherein selectively archiving the first data item comprises:
   upon determining that the importance measure exceeds a specified threshold, archiving the first data item to a data store.

10. The computer program product of claim 8, wherein selectively archiving the first data item comprises:
    upon determining that the importance measure does not exceed a specified threshold, deleting the first data item.

11. The computer program product of claim 8, wherein the relationship measure is directly proportional to the first hierarchical quotient and the total number of data items, and is inversely proportional to the overall number of data items.

12. The computer program product of claim 8, wherein the importance measure is directly proportional to the relationship measure.

13. The computer program product of claim 8, wherein the plurality of data items each correspond to an electronic data interchange (EDI) transaction.

14. The computer program product of claim 8, wherein the operation further comprises:
 assigning the first data item to a first bucket of a plurality of buckets based on the importance measure; and
 determining whether to archive or delete the first data item, based on the first bucket.

15. A system, comprising:
 a processor, and
 a memory storing program code having instructions, which, when executed on the processor, performs an operation, comprising:
  receiving a first data item of a plurality of data items of a data set, wherein the first data item was exchanged between a first entity and a second entity;
  determining a number of levels between the first entity and the second entity in a predefined hierarchy that includes the first and second entities;
  generating a first hierarchical quotient for a relationship between the first and second entities, based on the determined number of levels, wherein the determined number of levels is inversely related to the first hierarchical quotient;
  determining a total number of data items in the data set that were exchanged between the first and second entities;
  determining an overall number of data items in the data set that were exchanged between sets of entities having a hierarchical quotient matching the first hierarchical quotient;
  determining a relationship measure between the first entity and the second entity based on the first hierarchical quotient for the relationship between the first and second entities, the total number of data items, and the overall number of data items;
  determining an importance measure of the first data item based on the relationship measure;
  assigning the importance measure to the first data item, wherein the importance measure is used for an archiving decision for the first data item; and
  selectively archiving the first data item, based on the importance measure of the first data item.

16. The system of claim 15, wherein selectively archiving the first data item comprises:
 upon determining that the importance measure exceeds a specified threshold, archiving the first data item to a data store.

17. The system of claim 15, wherein selectively archiving the first data item comprises:
 upon determining that the importance measure does not exceed a specified threshold, deleting the first data item.

18. The system of claim 15, wherein the relationship measure is directly proportional to the first hierarchical quotient and the total number of data items, and is inversely proportional to the overall number of data items.

19. The system of claim 15, wherein the importance measure is directly proportional to the relationship measure.

20. The system of claim 15, wherein the operation further comprises:
 assigning the first data item to a first bucket of a plurality of buckets based on the importance measure; and
 determining whether to archive or delete the first data item, based on the first bucket.

\* \* \* \* \*